United States Patent
Graeve

(10) Patent No.: US 6,764,066 B2
(45) Date of Patent: Jul. 20, 2004

(54) HYDRAULIC DAMPING MOUNT FOR SUPPORTING A SPRING STRUT

(75) Inventor: Arndt Graeve, Koblenz (DE)

(73) Assignee: Trelleborg Automotive Technical Centre GmbH, Hoehr-Grenzhausen (DE)

(*) Notice: Subject to any disclaimer, the term of this patent is extended or adjusted under 35 U.S.C. 154(b) by 0 days.

(21) Appl. No.: 10/367,004

(22) Filed: Feb. 14, 2003

(65) Prior Publication Data

US 2003/0127788 A1 Jul. 10, 2003

Related U.S. Application Data

(63) Continuation of application No. PCT/EP01/09476, filed on Aug. 16, 2001.

(30) Foreign Application Priority Data

Aug. 17, 2000 (DE) .......................................... 100 40 201

(51) Int. Cl.[7] ........................ B60G 13/00; B60G 15/00; F16F 11/00; F16F 7/00
(52) U.S. Cl. .................... 267/220; 267/293; 267/64.13; 188/321.11
(58) Field of Search ................................. 267/195, 219, 267/220, 217, 292, 293, 294, 64.11, 64.13, 140.11, 140.12, 140.13, 200; 188/321.11; 280/124.121, 124.144, 124.145, 124.146, 124.147, 124.155, 124.177

(56) References Cited

U.S. PATENT DOCUMENTS

| | | | | |
|---|---|---|---|---|
| 4,434,977 A | * | 3/1984 | Chiba et al. ................... 267/33 |
| 4,773,635 A | * | 9/1988 | Buma ......................... 267/220 |
| 4,810,003 A | * | 3/1989 | Pinch et al. .......... 280/124.155 |
| 4,877,262 A | * | 10/1989 | Tanahashi et al. ..... 280/124.155 |
| 5,024,461 A | * | 6/1991 | Miyakawa et al. ..... 267/140.13 |
| 5,040,775 A | * | 8/1991 | Miyakawa ................... 267/220 |
| 5,064,176 A | * | 11/1991 | Goto ..................... 267/140.11 |
| 5,088,704 A | * | 2/1992 | Kanda ......................... 267/220 |
| 5,165,669 A | * | 11/1992 | Mayerbock et al. ... 267/140.12 |
| 5,232,209 A | * | 8/1993 | de Fontenay ............... 267/220 |
| 5,248,134 A | * | 9/1993 | Ferguson et al. ........... 267/220 |
| 5,251,928 A | * | 10/1993 | Maeda ................ 280/124.155 |
| 5,277,410 A | * | 1/1994 | Oshima et al. ............. 267/220 |
| 5,362,035 A | * | 11/1994 | Carter ....................... 267/220 |
| 5,664,650 A | * | 9/1997 | Kammel et al. ....... 188/321.11 |
| 6,007,061 A | * | 12/1999 | Kammel et al. ............ 267/220 |
| 6,427,814 B1 | * | 8/2002 | Miyamoto ............ 188/321.11 |
| 2002/0093170 A1 | * | 7/2002 | Deschaume et al. .. 280/124.177 |
| 2002/0145242 A1 | * | 10/2002 | Miyamoto et al. .......... 267/220 |

FOREIGN PATENT DOCUMENTS

| | | |
|---|---|---|
| DE | 40 15 524 C1 | 11/1991 |
| DE | 40 31 495 A1 | 4/1992 |

(List continued on next page.)

*Primary Examiner*—Robert A. Siconolf
*Assistant Examiner*—Devon Kramer
(74) *Attorney, Agent, or Firm*—Laurence A. Greenberg; Werner H. Stemer; Ralph E. Locher

(57) ABSTRACT

An hydraulic damping mount has an outer sleeve, an inner sleeve for securing thereto a piston of a spring strut (activatable in at least one direction), an elastomeric body and two chambers. The two chambers are interconnected via a gap. The inner sleeve comprises a radially projecting boss separating the two chambers from each other. The connection between the two chambers is configured in accordance with the invention as a gap between the boss and the outer sleeve so that when activated, the fluid flow through the gap is in the direction opposite to the movement of the boss, resulting in a reduction in the stiffness. This simplifies assembly whilst enhancing the stiffness response of the mount. The invention relates furthermore to a mount for supporting a spring strut in making use of such a mount.

9 Claims, 4 Drawing Sheets

FOREIGN PATENT DOCUMENTS

| | | |
|---|---|---|
| EP | 0 255 434 A1 | 2/1988 |
| EP | 0 410 397 B1 | 1/1991 |
| EP | 0 416 381 B1 | 3/1991 |
| EP | 0 456 959 B1 | 11/1991 |
| FR | 2 572 338 A1 | 5/1986 |
| FR | 2 671 839 A1 | 7/1992 |
| FR | 2 727 179 A1 | 5/1996 |
| GB | 613253 | 11/1948 |

* cited by examiner ced with a hydraulic damping fluid and in fluidic

US 6,764,066 B2

1

HYDRAULIC DAMPING MOUNT FOR SUPPORTING A SPRING STRUT

CROSS-REFERENCE TO RELATED APPLICATION

This application is a continuation of copending International Application No. PCT/EP01/09476, filed Aug. 16, 2001, which designated the United States and which was not published in English.

BACKGROUND OF THE INVENTION

Field of the Invention

The present invention relates to a hydraulic damping mount, more particularly for use as a support for mounting a spring strut, comprising an outer sleeve, an inner sleeve for securing thereto at least one component activatable in at least one direction, an elastomeric body and two chambers charged with a hydraulic damping fluid and in fluidic communication. The inner sleeve comprises a radially projecting boss that separates the two chambers from one another.

A hydraulic damping rubber mount is known from European patent EP 0 456 959 B1. There, between the boss protruding from the inner sleeve and the outer sleeve is an insert for configuring a fluid communication between the two chambers. Manufacturing that mount is thus relatively complicated.

When activated, the inner sleeve is displaced relative to the outer sleeve, preferably axially, so that there is a change in volume of the two chambers. Equalizing the volume is done by the flow of hydraulic fluid via the communication between the two chambers, whereby the resulting hydraulic damping effect counteracts the activation. In this known mount this hydraulic damping effect is effective also when activated externally even at low frequencies. This is why the mount features high stiffness in the higher frequency range. Thus, even an activation of small amplitude is communicated to the outer sleeve and the result is a noise nuisance.

Communicating such small amplitudes is undesirable, especially to the outer sleeve in automotive engineering applications and thus the stiffness of the mount needs to be low, if possible below the static stiffness level when activated at critical frequencies. However, as soon as a high amplitude activation occurs with a low frequency, for instance when the vehicle negotiates a curb, the stiffness of the mount needs to be high. It is only by means of this high stiffness that a high amplitude activation can be accommodated without damage to the mount.

SUMMARY OF THE INVENTION

It is accordingly an object of the invention to provide a hydraulic damping mount, which overcomes the above-mentioned disadvantages of the heretofore-known devices and methods of this general type and which provides for a mount with enhanced stiffness response with uncomplicated manufacture.

With the foregoing and other objects in view there is provided, in accordance with the invention, a supporting mount for a spring strut having a piston rod and a spring, comprising:

a hydraulic damping mount formed with an inner sleeve to be seated on the piston rod, the inner sleeve having a radially projecting boss, and an outer sleeve having a radially projecting plate for supporting the spring;

an elastomeric body connecting the inner sleeve to the outer sleeve and forming therewith two fluidically connected chambers charged with a hydraulic damping fluid;

2 the boss of the inner sleeve and the outer sleeve defining an annular gap therebetween connecting the chambers;

the elastomeric body having a substantially cylindrical shape and projecting from an underside of the plate of the outer sleeve and having a frontal bearing surface for supporting the spring of the spring strut; and an envelope of elastomeric material having a variable thickness surrounding the boss.

In other words, the objects are achieved by a mount of the aforementioned kind in that the fluid communication is configured as a gap between the boss and the outer sleeve so that when activated the fluid flow through the gap is in the direction opposite to the movement of the boss. Furthermore, the "inner" elastomeric body (between the sleeves) and the "outer" elastomeric body (on which the spring is supported) are formed substantially in one piece.

The insert provided in the prior art mount can now be totally eliminated, resulting in fewer component parts being necessary to thus substantially simplify assembly.

Furthermore, the stiffness response as compared to the prior art mount is now substantially enhanced. Since the boss is attached to the inner sleeve for connection to an activated component the hydraulic fluid now flows in the opposite direction of the movement of the boss when activated, whilst avoiding the fluid being entrained in the movement of the boss. Due to the fluid flow contrary to the direction of activation the stiffness can now be reduced down to attaining the natural frequency of the fluid flow. In this arrangement the boss may be configured ring or star-shaped or fingered in form.

This results in the stiffness of the mount when activated by a small amplitude now no longer increasing, or only negligably up to a critical frequency. Indeed, depending on the hydraulically effective surface area to the cross-section of the fluid communication the dynamic stiffness can be reduced to below the static stiffness, also termed "under-swing." In this arrangement, the hydraulically effective surface area substantially corresponds to the surface area of the boss at the inner sleeve. When using a round boss and a round outer sleeve the cross-section in the fluid communication connection is circular. As long as the ratio between the hydraulically effective surface area and the cross-section is less than unity the desired reduction in stiffness is achievable.

The critical frequency at which the mount gains in hardness, causing a corresponding increase in the stiffness, depends on the cross-section of the fluid communication connection and on the mass of the fluid in this connection. This frequency increases, the larger the cross-section, and decreases, the higher the mass flow, for example due to an elongation of the fluid communication connection, it being a natural frequency of the fluid oscillating in the connection. This is why it can be altered in the mount in accordance with the invention by varying the diameter and/or thickness of the boss, i.e. tailoring it to the individual circumstances. There is no need to alter the outer sleeve.

It is advantageous for the boss to be enveloped in an elastomeric material. By varying the thickness of this envelope the cross-section and length of the fluid communication connection can be altered in thus setting the response of the mount. Furthermore, this envelope prevents the outer sleeve from being damaged due to prohibitively high activation, i.e. it serving as an inner stop.

In accordance with an added feature of the invention, the inner sleeve is elongated into an elongated portion of the outer sleeve. The elastomeric body then extends into the interspace between this portion and the inner sleeve in achieving the static stiffness of the mount in accordance with the invention.

In this arrangement the outer sleeve may be configured split in such a way to advantage that the first part forms the section of the larger diameter outer sleeve and the radially inswept flange, whilst the second part of the outer sleeve provides the elongated portion.

When the mount is configured to support a spring strut with a piston rod a bearing surface is provided for supporting a spring. The piston rod is supported by the hydraulic damping mount as described above and secured to the inner sleeve.

Advantageously, the supporting mount comprises an upper and a lower plate having projecting, substantially cylindrical portions forming the outer sleeve. Making use of separate plates substantially facilitates manufacture and assembly of the supporting mount.

In accordance with one advantageous further embodiment the projecting portion of the lower plate translates into a substantially conical portion. This conical portion provides a buffer for stopping the spring strut in preventing prohibitively large loads and displacements. Optionally it may serve to mount a helper spring.

In another advantageous aspect the lower plate comprises a further portion projecting in the direction of the upper plate and protruding into the portion of the upper plate, it being this further portion that centre-locates the two plates.

Further advantage is obtained in that the elastomeric body extends sandwiched between the two plates, it possibly covering the full surface area of one of the two plates in achieving a reliable seal of the chambers and the fluid communication connection. It is this arrangement that prevents any relative displacements of the plates in operation causing a noise nuisance.

In another advantageous further embodiment the bearing surface supporting the spring is supported independently of the inner sleeve, such a version of the supporting mount being termed decoupled in permitting achieving optimum noise vibration insulation and ride.

The supporting mount preferably has several bolts for securing it to the vehicle body. These bolts pass through both plates to thus simultaneously locate and fix them in place on the body.

The fact that the elastomeric body is configured integrally in one piece simplifies design and manufacture.

Other features which are considered as characteristic for the invention are set forth in the appended claims.

Although the invention is illustrated and described herein as embodied in a hydraulic damping mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
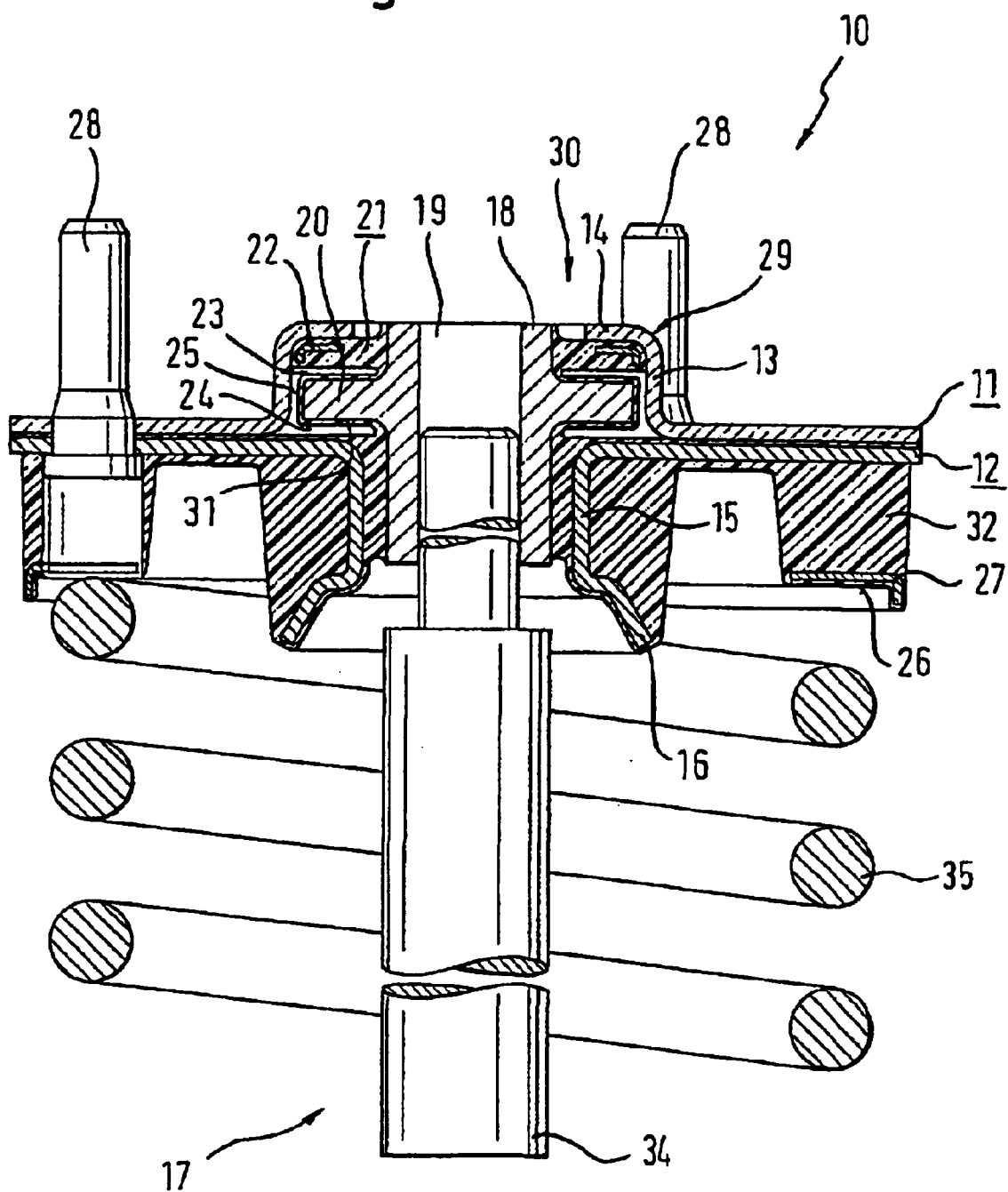
FIG. 1 is a diagrammatic cross-section through a first exemplary embodiment of the supporting mount according to the invention.

Referring now to the figures of the drawing in detail and first, particularly, to FIG. 1 thereof, there is shown a diagrammatic cross-section through a supporting mount 10 that includes an upper plate 11 and a lower plate 12. The upper plate 11 is provided with an upswept, substantially cylindrical portion 13. At the end of the portion 13 there is provided a radially inswept flange 14. The lower plate 12 comprises likewise a substantially cylindrical projecting portion 15 that merges into a conical portion 16. These portions 13, 14, 15 form an outer sleeve 29. The portion 16 serves to mount a non-illustrated auxiliary spring of the spring strut 17.

An inner sleeve 18 is arranged in the outer sleeve 29. The inner sleeve 18 has a drilled through-hole 19 (bore 19) and a radially outswept boss 20. A piston rod 34 of the spring strut 17 is secured in the drilled through-hole 19. In its implementation, the piston rod 34 is jolted, for example, by bumps in the road surface. The inner sleeve 18 and the outer sleeve 29 in this arrangement are connected via an elastomeric body 21. This elastomeric body 21 is provided at its end facing the flange 14 with a reinforcement insert 22 to enhance the sealing effect. The elastomeric body 21 extends between the two plates 11, 12 and the elongation of the inner sleeve 18 and the portion 15 of the lower plate 12.

Two chambers 23, 24 are formed between the inner sleeve 18 and the outer sleeve 29. These chambers 23, 24 are charged with a hydraulic damping fluid and interconnected via an annular gap 25. In this arrangement the annular gap 25 is configured between the boss 20 and the portion 13 of the outer sleeve 29, resulting in a hydraulic damping mount 30 consisting substantially of inner sleeve 18, boss 20, elastomeric body 21 and outer sleeve 29.

The boss 20 is provided with an envelope 31 which is likewise configured in one piece of the same material as the elastomeric body 21. Varying this envelope 31 permits tailoring the dimensions of the chambers 23, 24 and annular gap 25 without any alteration of the inner sleeve 18 or outer sleeve 29 to the changing circumstances.

The supporting mount 10 comprises furthermore a substantially cylindrical configured portion 32 including an inlay 27. The portion 32 surrounds the portions 15, 16 of the lower plate 12 in forming a bearing surface 26 for supporting a spring 35 of the spring strut 17.

Several bolts 28 serve to secure the complete supporting mount 10 to a non-illustrated vehicle body. The bolts 28 pass through both plates 11, 12 to center-locate them.

Figure 2:
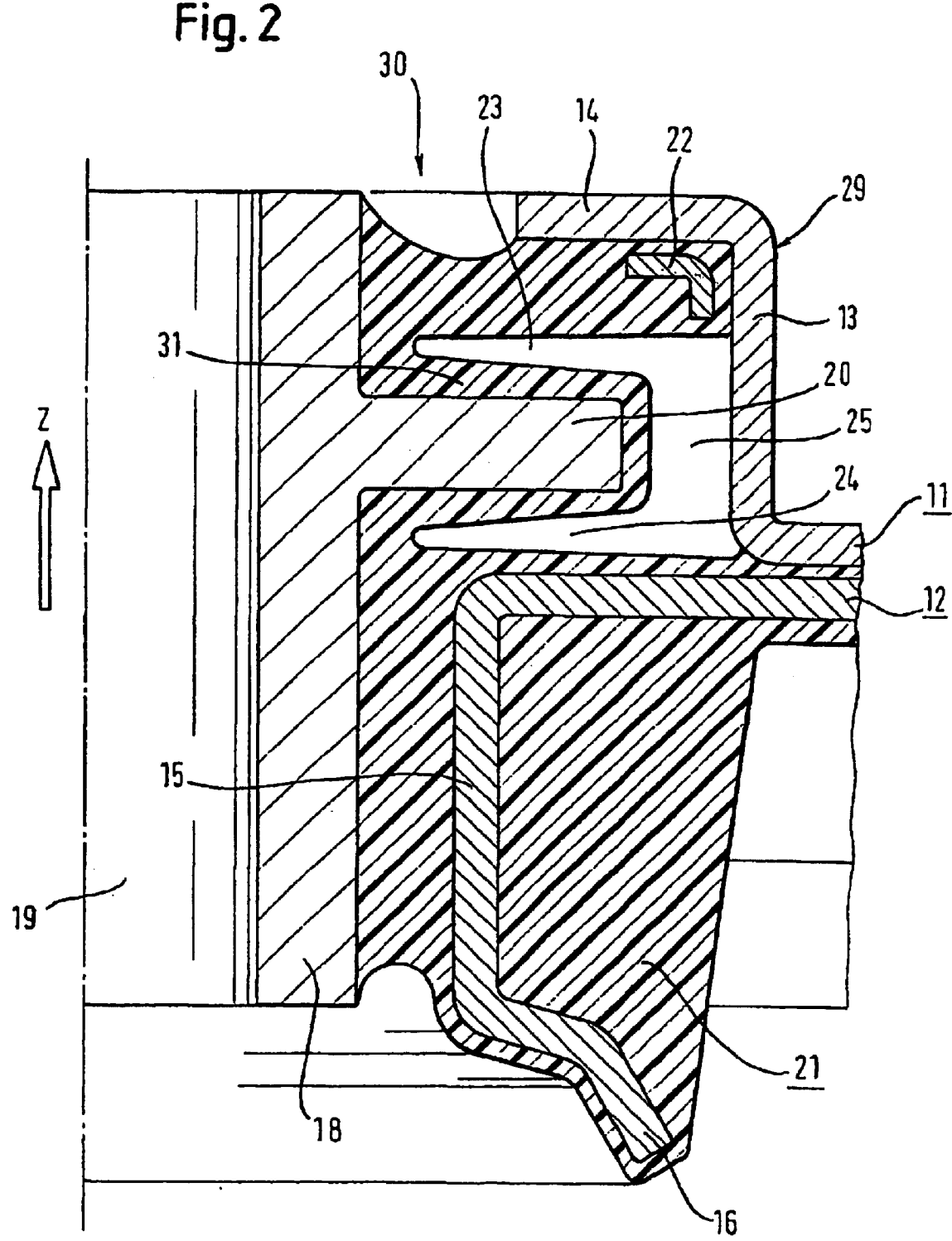
FIG. 2 is a half section through the hydraulic damping mount in the supporting mount as shown in FIG. 1.

Referring now to FIG. 2 there is illustrated the mount 30 as will now be detailed as to structure and function. As soon as the mount 30 is activated in the direction of the arrow Z the inner sleeve 18 is displaced relative to the outer sleeve 29 in this activation direction Z. The boss 20 arranged at the inner sleeve 18 results in a change in volume of the chambers 23, 24. In the example as shown, the volume of the chamber 23 is reduced whilst the volume of the chamber 24 is increased, the fluid thus flowing in the opposite direction of the activating direction Z through the annular gap 25. Depending on the dimensioning of the boss 20, the thickness of the envelope 31 and on the diameter of the outer sleeve 29 an underswing materializes. As soon as the activation frequency approaches the natural frequency of the oscillating fluid the stiffness of the mount 30 droops to a minimum before rising again. In other words, a droop in the stiffness is attained for small amplitudes up to a critical frequency. At the same time, the necessary high stiffness is furnished for large amplitudes in the low frequency range.

In this example of the mount 30, hydraulic damping takes place totally above the lower plate 12 and thus the diameter of the portion 13 of the outer sleeve 29 exceeds that of the portion 15 located at the other side of the boss 20, i.e. simply replacing the upper plate 11 thus permits speedy customized manufacture of the mount 30.

The inner sleeve 18 is projecting substantially parallel to the portion 15 of the lower plate 12. The elastomeric body 21 extends sandwiched between the portion 15 and inner sleeve 18 in furnishing the desired static stiffness whilst simultaneously counteracting any movement of the inner sleeve 18 in a direction transversely to the direction of activation Z. The boss 20 including its envelope 31 serves as a stop in the direction of activation Z as well as in the two other spatial directions.

Figure 3:
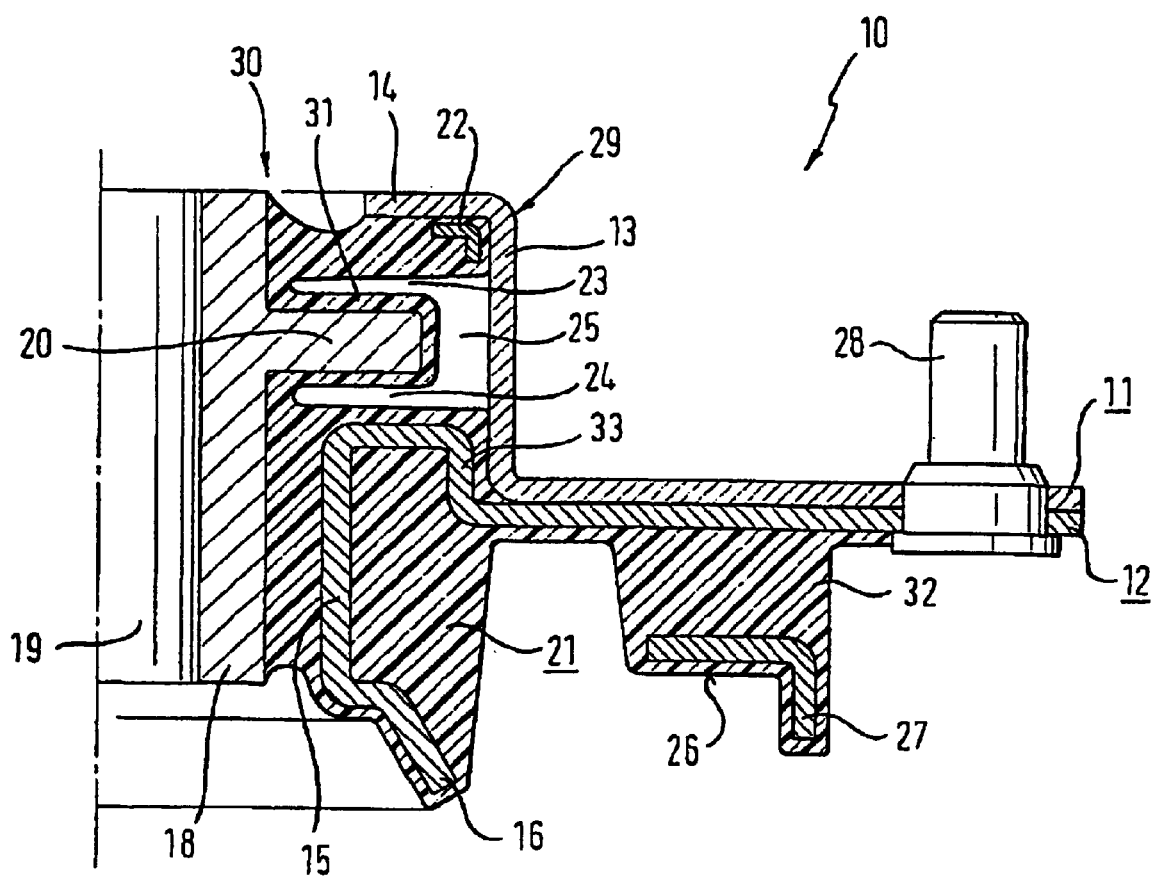
FIG. 3 is a half section through a further exemplary embodiment of the supporting mount according to the invention.
Figure 4:
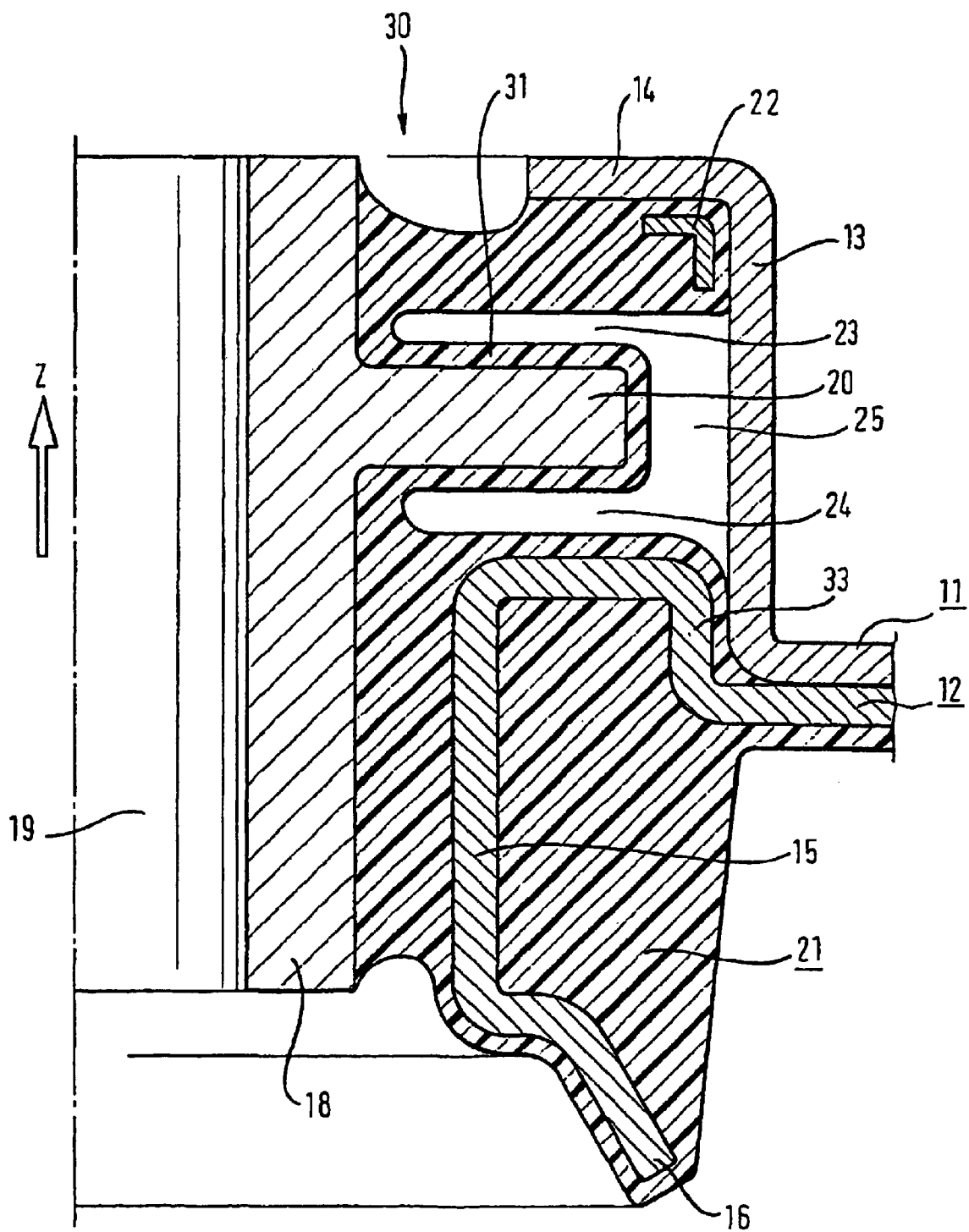
FIG. 4 is a half section through the mount portion of the supporting mount as shown in FIG. 3.

Referring now to FIGS. 3 and 4 there is illustrated a further exemplary embodiment of the supporting mount 10 in accordance with the invention and a mount 30 in accordance with the invention. The lower plate 12 comprises in this aspect a further portion 33 projecting in the direction of the upper plate 11. The portion 33 protrudes into the portion 13 of the upper plate 11 to centre-locate the two plates 11, 12 whilst sealing the chambers 23, 24.

In this arrangement, the elastomeric body 21 extends sandwiched between the two portions 13, 33 and further on between the plates 11, 12 in preventing nuisance noise on movement of the plates 11, 12.

Accordingly, in addition to simplifying assembly and furnishing an enhanced stiffness, the mount can be speedily and simply customized to the changing circumstances.

I claim:

1. A supporting mount for a spring strut having a piston rod and a spring, comprising:

a hydraulic damping mount formed with an inner sleeve to be seated on the piston rod, said inner sleeve having a radially projecting boss, and an outer sleeve having a radially projecting plate assembly for supporting the spring, said plate assembly including an upper plate and a lower plate having a substantially cylindrical projecting portion; and an elastomeric body connecting said inner sleeve to said outer sleeve and forming therewith two fluidically connected chambers charged with a hydraulic damping fluid, said elastomeric body including an envelope having a variable thickness and surrounding said boss;

said envelope of said elastomeric body and said outer sleeve defining an annular gap therebetween connecting said chambers;

said elastomeric body being constructed as a one-piece part projecting from an underside of said outer sleeve and having a frontal bearing surface for supporting the spring of the spring strut, said elastomeric body extending between said upper plate and said lower plate, and said elastomeric body having an elongation at said inner sleeve and said substantially cylindrical portion.

2. The supporting mount according to claim 1, wherein said inner sleeve is elongated into said substantially cylindrical portion; and said elastomeric body extends into an interspace between said substantially cylindrical portion and said inner sleeve.

3. The supporting mount according to claim 1, wherein said upper plate has a projecting, substantially cylindrical portion forming a part of said outer sleeve.

4. The supporting mount according to claim 1, wherein said projecting portion of said lower plate merges into a substantially conical portion.

5. The supporting mount according to claim 1, wherein said lower plate comprises a further portion projecting in a direction of said upper plate and protruding into the substantially cylindrical portion of said upper plate.

6. The supporting mount according to claim 1, wherein said a elastomeric body extends sandwiched between said upper and lower plates.

7. The supporting mount according to claim 1, wherein said bearing surface for supporting said spring is supported independently of said inner sleeve.

8. The supporting mount according to claim 1, which comprises a plurality of bolts passing through said upper and lower plates for securing said hydraulic mount to a vehicle body.

9. In combination with a spring strut having a piston rod and a spring, a hydraulic damping mount, comprising:

an inner sleeve to be seated on the piston rod, said inner sleeve having a radially projecting boss;

an outer sleeve having a radially projecting plate assembly for supporting the spring of the spring strut, said plate assembly including an upper plate and a lower plate having a substantially cylindrical projecting portion; and an elastomeric body extending between said inner sleeve and said outer sleeve and between said radially projecting plate assembly and the spring of the spring strut, said elastomeric body, said inner sleeve, and said outer sleeve defining a plurality of fluidically connected chambers charged with a hydraulic damping fluid, said elastomeric body including an envelope having a variable thickness and surrounding said boss;

said envelope of said elastomeric body and said outer sleeve defining an annular gap therebetween connecting said chambers;

said elastomeric body being constructed as a one-piece part projecting from an underside of said outer sleeve and having a frontal bearing surface for supporting the spring of the spring strut and said elastomeric body having an elongation at said inner sleeve and said substantially cylindrical portion.

* * * * *